Patented Apr. 17, 1945

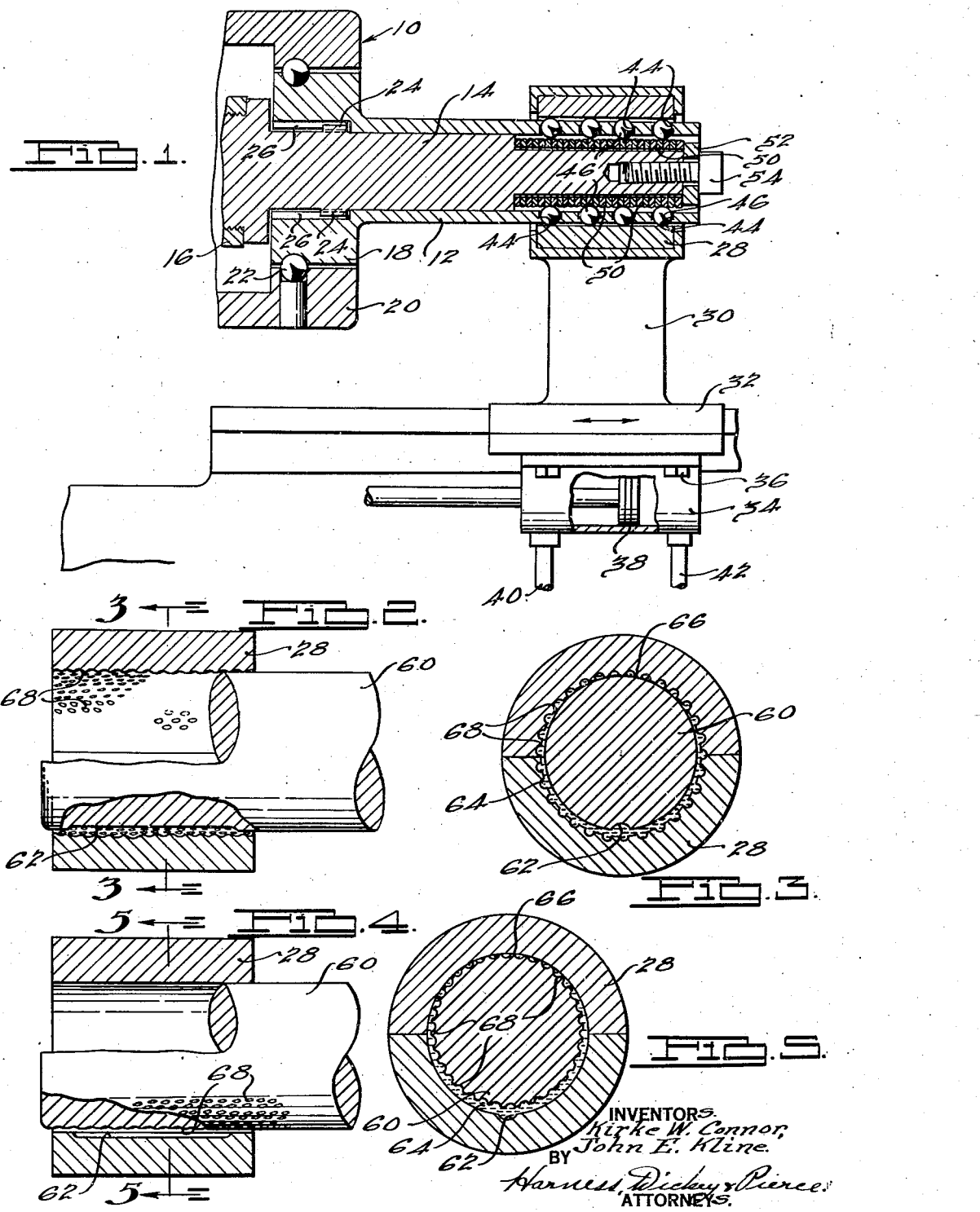

2,373,871

UNITED STATES PATENT OFFICE 2,373,871

METHOD OF PEENING SURFACES

Kirke W. Connor, Oxford, and John E. Kline, Grosse Pointe Farms, Mich., assignor to Micromatic Hone Corporation, Detroit, Mich., a corporation of Michigan Application January 23, 1942, Serial No. 427,939

1 Claim. (Cl. 29—149.5)

The present invention relates to bearings, and particularly relates to new and improved types of bearing surfaces, and a novel method of producing such bearing surfaces.

The present application is related to the co-pending application of John E. Kline, Douglas T. Peden, and Charles S. White, Serial No. 427,938, filed concurrently herewith, in which a peening device is disclosed and claimed, by which the method of the present invention may be practiced.

One of the primary objects of the present invention is to provide a simple and inexpensive method for producing bearing surfaces of superior operating characteristics.

Another object of the invention is to provide improvements in bearing surfaces in which the lubricant is forced into the loaded area of the bearing surface by virtue of the relative movement between the bearing surfaces, to thereby accomplish a decrease in frictional loss and an increase in load carrying capacity.

A further object is to lessen the possibility of molecular adhesion between materials constituting the bearing surface.

Another object is to provide an improved process of producing bearing surfaces whereby localized residual stresses in the surface striations of either or both of the bearing surfaces may be neutralized so as not to detract from the respective fatigue endurances of the members.

A still further object of the invention is to provide a novel method for increasing the density of the surface and sub-surface molecular structures of the bearing members to increase their resistance to wear.

A further object of the invention is to provide a novel method for producing finished surfaces on bearing members in which such bearing members are provided with a novel depository space for eroded or corroded matter and foreign particles so as to minimize the deleterious effects of such foreign matter upon the bearing members.

Another and more specific object of the invention is to provide a novel process for creating non-communicating, isolated recesses of reliably controlled contour and uniformity of deposition and of geometrically accurate dimensions upon bearing members, thereby producing novel bearings.

Other objects of the invention will become apparent from the following specification, the drawing relating thereto, and from the claim hereinafter set forth.

In the drawing, in which like numerals are used to designate like parts in the several views throughout:

Figure 1 is a fragmentary, cross-sectional view of a device by which the method of the present invention may be practiced to produce the bearing articles of the present invention;

Fig. 2 is a cross-sectional view with parts in elevation and parts broken away, showing portions of such parts in cross-section of an improved bearing assembly according to the present invention;

Fig. 3 is a cross-sectional view taken substantially along the line 3—3 of Fig. 2;

Fig. 4 is a view, similar to Fig. 2, illustrating a modified form of the present invention; and, Fig. 5 is a cross-sectional view taken along the line 5—5 of Fig. 4.

Before giving a detailed description of the method and articles of the present invention, it is believed that a general discussion of certain problems that must be met when designing bearings will be helpful in understanding the present invention, and also for the purpose of differentiating between the present invention and the prior art. The term "bearing surfaces" as used herein, is to be construed as those portions of adjacent parts moving in relatively parallel planes, or concentric planes, which are subjected to either or both the compressive force imposed by the load and the shear force resulting from resistance to motion between the parts. The relative motion between the parts may be either rotative or linear. Conventional practice involves:

(1) The selection of materials for the component parts which possess the ability to withstand the unit stresses imposed without appreciable attendant deformation, aversion to molecular adhesion between the parts, and adaptability of each to the distortion of the other.

(2) Provision of means for adequate lubrication to minimize the generation of frictional heat, and absorbing the products of wear, such as corrosion and erosion, and such particles of foreign matter as may be preesnt.

(3) The generation of surfaces so they would be macro-geometrically conformative to one another and macro-geometrically compatible.

According to the present invention the critical aspects listed under 1 and 3 above, are reduced through a more judicious and reliable use of the means stated under 2. It is recognized and readily acknowledged by those versed in this art that bearing surfaces which move upon one another, and are properly lubricated, should never come into physical contact with each other. Their respective coefficients of friction and wear under such conditions of operation thence are predicated upon: one, the molecular friction within the lubricant itself, and, two, the corrosion or erosion between the lubricant and each of the bearing surfaces.

It is equally recognized that bearing surfaces are seldom, if ever, thusly lubricated without sacrificing one or both of the essential requirements of bearings, i. e., load carrying capacity and flexibility in operating speed. In general practice, bearings are afforded what is commonly termed "boundary lubrication," i. e., any maximum load-speed factor at which the lubricating film starts to break down.

This state of boundary lubrication permits the bearing surfaces to come into periodic physical contact, the frequency and prolongation of which may cause an increase in friction, heat and wear, thermal distortion of the surfaces effecting their relative fits, and generation of high stress areas resulting in scuffing and ultimate seizure.

Were it not for the occurrence of the above stated effects during physical contact between bearing surfaces, no consideration of their frictional values would need to be made in the selection of materials for them. Contrarywise, it is an established fact that "bearing" materials are selected on the basis of their suitability under conditions bordering on failure of the lubricating means. Hence the inclusion of copper, zinc, lead, tin, silver, antimony, aluminum, etc., in "bearing" compounds of "low inherent frictional values." These materials also possess the inherent ability to absorb metal powders and solid particles of foreign material in the lubricant, thus lessening their destructive effect upon the co-operating member of the bearing.

The lubricating film between loaded surfaces must usually depend upon the motion of those surfaces relative to each other for its replacement. In an annular bearing, in particular, the loaded area is positioned on one side of its axial plane; and the area of this plane, that is, the diameter of the bearing times its length, is regarded as the "projected area" of the bearing. Because of the necessity for "operating clearance," the actual area of physical contact, when it occurs, between the bearing members, is a minute fraction of their "projected area." It is important, therefore, that the lubricating medium be compelled to fill this "operating clearance" space at all times during motion if the load capacity of the projected area is to be approached.

Because of the differential in pressure upon the lubricant in the loaded and unloaded areas of the bearing, the tendency of this medium is to flow from the load to the non-load side of the bearing. From this it is obvious that replacement of the lubrication on the load side of the bearing necessitates the use of a pumping force equal to the pressure differential. This pumping action within a bearing can best be accomplished by the moving part. It is consequently important that at least this moving part be provided with the means for adequately and effectively performing this function, as is done according to the present invention.

The manner in which this pumping means is created in the present invention also subjects the sub-surface of the bearing member material to a cold working, or plastic flow. This action serves to neutralize any localized residual stresses which may exist in surface striations or sub-surface interstices of the material, and which detract from its ultimate fatigue strength.

This platic flow also produces a hardening or increased density effect upon the surface of the member with an attendant increase in its resistance to wear and fatigue. Even though direct physical contact between the co-operating surfaces of the bearing were avoided, wear between them may be induced by the presence of unabsorbed metal powders or solid particles of foreign matter.

The character of the surface generated by the method employed in the present invention affords a depository space for this matter, much after the manner of the bearing compounds mentioned above. It does not, however, necessitate the actual impregnation of this matter into either of the bearing members. In consequence, it is possible for these particles to be flushed out of the bearing by the movement of the lubricant therein.

Due to the enforced flow of lubricant to the loaded areas of the bearings produced by the method of the present invention, the generation of the frictional heat in operation is virtually eliminated. If, however, by some vagary of mechanics, such as extreme overloading, or failure in lubricant supply, direct physical contact between the bearing members should obtain, radiation of the additional generated frictional heat is afforded by the fact that the exposed surface area of the bearing is greater than the normal bearing area. Also contributing to this are the controlled amount of planular bearing area and disposition of bearing area pattern and also the increased hardness of the superficial surface material to a controlled depth. Too, the presence of lubricant trapped in the isolated recesses in this type of bearing surface renders improbable the likelihood of the bearing running dry.

While the method of the present invention may be practiced with various apparatus, one apparatus by means of which the isolated recesses may be produced is disclosed in detail and claimed in the copending application above mentioned.

In general the steps of the method practiced by such machine are as follows: The part to be treated is subjected to a preliminary operation, such as fine boring or turning, grinding or honing, to generate the required geometrical shape and size for the part. Thereafter the surface of the part is control peened by an apparatus such as that described in the copending application above referred to. It is pointed out that this latter operation produces a result vastly different from that obtained by sand or shot blasting, as the configuration of the recesses left by sand or shot blasting are not uniform in shape, size, or spacing, and may overlap and communicate with each other so that they are neither controlled nor non-communicative. The controlled peening action with the apparatus above described is assured by virtue of the fact that the apparatus is accurate of itself and performs upon the surface of a part which is of accurate dimensions. The peen marks or recesses therefore are of a definite, uniform depth and spacing, and bear the general shape of the pressure impacted members which formed them. As a result of this peening action, certain deformations are developed around and between the recesses. In a supplementary operation these deformations are machined away, thereby restoring geometric accuracy to the part.

Referring to the drawing, an apparatus is illustrated in Fig. 1 by which the process of the present invention may be practiced to produce bearings of the present invention. Such apparatus is similar to one of those disclosed in the co-pending application above referred to and reference may be had to such application for a more detailed description thereof. The peening apparatus is generally indicated at 10 and includes a sleeve 12 which projects over an arbor 14. Such arbor 14 is threadably connected to an axially aligned sleeve 16 of the machine which reciprocates and rotates the arbor 14. Such machine may be such as that disclosed and claimed in the co-pending application of D. T. Peden, Serial No. 365,526, filed November 13, 1940, and assigned to the assignee of the present invention. The sleeve 12, which encompasses the arbor 14, is provided with a race portion 18 which cooperates with an outer sleeve 20 to form a roller bearing having balls 22 disposed in the raceway of the race portion 18 and sleeve 20. The arbor 14 has splines 24 which operate in splineways 26 in the inner surface of the sleeve 12.

Means are provided in the Peden machine above referred to for rotating and reciprocating the sleeve 16, and consequently for rotating and reciprocating the arbor 14. Such means may be set so that the element 14 may be rotated only or reciprocated only, or any variation between the speed in rotation and reciprocation may be obtained. The length of stroke in reciprocation of the element 14 may also be adjusted. The Peden machine above-referred to is merely referred to for completeness, and it is to be understood that any other machine which will produce the relative movement between the peening device and the workpiece may be employed.

A bearing shell 28 is clamped in a standard 30 which is carried by a table 32. The underside of the table has a cylinder 34 secured thereto by bolts 36 for operating over a piston 38 under the influence of fluid introduced through conduits 40 and 42. The table may be advanced slowly over the tool 10 or it may reciprocate over the tool during the time the sleeve 12 is rotated and reciprocated. The sleeve 12 is provided with truncated spherical apertures 44 in which balls 46 are disposed and which are of such a size as to project from the apertures 44 while being retained within such apertures by the reduced outer edge portions.

The arbor 14 has an end portion 48 of reduced diameter over which a plurality of washers 50 are disposed and secured in juxtaposition by a washer 52 retained on the end of the arbor 14 by a bolt 54. The reduced end portion may be open, as indicated, to permit the washers 50 to have lateral movement. The washers are arcuate in shape at the peripheral edges thereof to provide circumferential recesses at the point where two of the washers abut and circumferential projections materially of the arcuate faces of the washers.

As the sleeve 12 is reciprocated over the arbor 14 the balls 46 will move from the depressed areas and will project outwardly from the sleeve 12 as the balls are engaged by the materially projected portion of the washer. The balls are continuously extended and retracted by the washers to thereby apply material pressure at the point of engagement of the balls with the surface to produce the indentations or interstices desired in the bearing surface of the workpiece 28. It will be noted that the balls 46 are disposed as closely together as possible, both when aligned longitudinally of the sleeve and when radially disposed about the circumference thereof.

The rotation and reciprocation of the spindle or sleeve 16 produces the rotation and reciprocation of the arbor 14 which produces the rotation of the sleeve 12 therewith. The sleeve 12 rotates but does not reciprocate as the peening operation progresses. Similarly, the movement of the table 32 may be adjusted to feed the bearing 28 slowly over the balls 46. Preferably the rotation of the sleeve 12 and the movement of the table 32 are synchronized with each other in timed relation to the reciprocation of the arbor 14 so as to produce closely adjacent interstices which are spaced apart and which are disposed on over-crossing helical paths around the surface of the sleeve. A subsequent operation is thereafter performed on the surface of the workpiece to machine off the high spots about each interstice to return the sleeve to its original diameter and finish its inner surface at all points except where interstices occur. All of the interstices will be disconnected from each other so that each will form a pocket for trapping the lubricant and for carrying the lubricant across the face of the bearing.

It will thus be apparent that the multiplicity of pressure impacted radial movements of the balls 46 function to produce a corresponding multiplicity of interstices in the surface of the workpiece.

The number of such interstices per unit area and the size of such interstices will depend upon the functional nature of the bearing upon which they are employed. For example, where the movement between the bearing parts is relatively slow, a large number of such interstices will be required so that an adequate supply of oil in the load area is maintained. When the relative speed between the bearing parts is greater, fewer interstices will be required. The size and number required is a matter of determination depending upon these functional factors of the bearing, and is such that an adequate and proper supply of oil is maintained in the load area.

Referring to Figs. 2 and 3, a shaft 60 is illustrated as being disposed within the bearing 28 and in this embodiment the shaft 60 is the fixed or stationary element while the bearing 28 is the moving or rotary member. The shaft 60 is provided with a groove 62 at the bottom thereof, the ends of which are within the confines of the bearing 28, and which serve to provide a comparatively small space for a well or reservoir for oil.

The illustration in Figs. 2 and 3 is greatly exaggerated with respect to the proportions of the interstice size and also with respect to the offset of the axis with the shaft 60 with respect to the axis of the bearing 28, for purpose of clarity. In actual practice the axis of the shaft 60 is not exactly coincident with the axis of the bearing 28, but it is not as far out of coincidence as illustrated in the drawing. The annularly tapered cross section of the lubricating medium 62 is commonly referred to as "wedge film" of the lubricant. As the bearing is subjected to greater loads the taper of this film becomes more pronounced and may conceivably reach a thickness or thinness of zero at the loaded area, such as that indicated at approximately 66. When the tangential force of shear, resulting from the load upon and relative movement between the surfaces at area 66, overcomes the cohesive ability of the lubricant to cling to the moving member, the range of boundary lubrication is said to have been exceeded. Thereupon the possibility of seizure between the surfaces becomes imminent.

The minute interstices or depressions 68 in the moving member 28 serve to carry a greater amount of lubricant into the proximity of the loaded area 66. By virtue of their impelling action on the lubricant the latter need not be required to be of a particular viscosity or cohesiveness to enable its being drawn into the loaded area and thus satisfactorily perform its function. Because of the isolation but controlled proximity of the recesses 68, as above described, no communicative flow of lubricant can occur between them except over the areas between the interstices. These areas constitute the region of direct physical contact with the co-operating member if and when said contact should occur. Such contact, especially if at all prolonged, would tend to produce rapid wear of either or both of the members. The eroded material thus dislodged is enabled to escape from the loaded area for depositing itself in one of the adjacent depressions 68, thus rendering it incapable of appreciable harm to the bearing surfaces.

Referring to Figs. 4 and 5, the bearing 28 is the stationary member and the shaft 60 is the moving or rotating member. In this instance the bore of the bearing 28 is smooth and the indentations or interstices are provided on the outer surface of the shaft 60 in that region within the bearing 28. The groove 62 is formed at the bottom of the bearing 28. The formation and action of the "wedge film" of the oil 64 is like that discussed above. In this instance the rotating member 60 carries the oil to the loaded area.

The indentations 68 may be suitably formed in the outer surface of the shaft 60. One manner in which they may be formed is to use a modified, standard knurling tool in which such knurling tool is modified by substitution of half-spherical members for the die elements of the standard knurling tool. By passing such tool over the external surface with pressure, the indentations 68 may be provided. Such a tool may also be employed to provide the indentations or interstices on planular bearing elements.

Formal changes may be made in the specific embodiments of the invention disclosed without departing from the spirit and substance of the invention, the scope of which is commensurate with the appended claim.

What is claimed is:

The method of forming an improved bearing surface on the inner face of a bearing sleeve which includes the steps of swaging the entire area of the surface by simultaneously displacing metal at a plurality of predetermined spaced points to a predetermined depth in the surface, and repeating the operation until the entire surface is provided with overlapping interstices, the metal walls of which are harder than the base metal of the sleeve.

KIRKE W. CONNOR.
JOHN E. KLINE.